US011167632B2

(12) United States Patent
Yasuda et al.

(10) Patent No.: US 11,167,632 B2
(45) Date of Patent: Nov. 9, 2021

(54) VIBRATION-DAMPING DEVICE (71) Applicants: SUMITOMO RIKO COMPANY LIMITED, Komaki (JP); TOYOTA JIDOSHA KABUSHIKI KAISHA, Toyota (JP)

(72) Inventors: Takayoshi Yasuda, Komaki (JP); Yoshinori Watanabe, Komaki (JP); Naoki Furumachi, Komaki (JP); Keishi Hatanaka, Komaki (JP); Hiroyuki Ichikawa, Komaki (JP); Yuji Matsubara, Toyota (JP); Kentaro Mori, Toyota (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 16/214,811

(22) Filed: Dec. 10, 2018

(65) Prior Publication Data
US 2019/0193548 A1 Jun. 27, 2019

(30) Foreign Application Priority Data

Dec. 22, 2017 (JP) .............................. JP2017-246569
May 23, 2018 (JP) .............................. JP2018-098880

(51) Int. Cl.
*B60K 5/12* (2006.01)
*F16F 13/04* (2006.01)
(Continued)

(52) U.S. Cl.
CPC .......... *B60K 5/1283* (2013.01); *B60K 5/1208* (2013.01); *F16F 13/04* (2013.01);
(Continued)

(58) Field of Classification Search
CPC ..... B60K 5/1283; B60K 5/1208; F16F 13/04; F16F 15/022; F16F 13/22; F16F 2224/025; F16F 2228/04; F16F 2230/0005
(Continued)

(56) References Cited

U.S. PATENT DOCUMENTS 6,276,673 B1 * 8/2001 Hibi ...................... F16F 13/264
267/140.14
6,378,850 B1 * 4/2002 Shimizu ................. F16F 13/10
267/140.13
(Continued)

FOREIGN PATENT DOCUMENTS

CN 102705428 A 10/2012
CN 107218344 A 9/2017
(Continued)

OTHER PUBLICATIONS

Mar. 27, 2020 Office Action issued in Japanese Patent Application No. 2018-098880.
(Continued)

*Primary Examiner* — Christopher Garft
*Assistant Examiner* — Michael McDuffie
(74) *Attorney, Agent, or Firm* — Oliff PLC (57) ABSTRACT A vibration-damping device including: a first mounting member configured to be mounted to one of components of a vibration transmission system; a second mounting member configured to be mounted to an other of the components of the vibration transmission system; a main rubber elastic body connecting the first mounting member and the second mounting member elastically to each other; a bracket attached to the second mounting member, the bracket having a mounting part configured to be mounted to the other of the components of the vibration transmission system; a tubular
(Continued)

outer member secured press-fit to the second mounting member; a mass member disposed within the tubular outer member; and a support rubber fixed at an outer peripheral part of the mass member, the support rubber elastically connecting the tubular outer member and the mass member to constitute a dynamic damper.

12 Claims, 7 Drawing Sheets

(51) Int. Cl.
 *F16F 15/02* (2006.01)
 *F16F 13/22* (2006.01)
(52) U.S. Cl.
 CPC ........... *F16F 15/022* (2013.01); *F16F 13/22* (2013.01); *F16F 2224/025* (2013.01); *F16F 2228/04* (2013.01); *F16F 2230/0005* (2013.01)
(58) Field of Classification Search
 USPC ....... 248/565, 560, 562, 568, 570, 580, 618, 248/631, 636
 See application file for complete search history.

(56) References Cited

U.S. PATENT DOCUMENTS

| | | | | |
|---|---|---|---|---|
| 7,293,755 B2* | 11/2007 | Miyahara | ............... | F16F 13/085 248/560 |
| 7,520,486 B2* | 4/2009 | Kim | ...................... | F16F 13/108 248/562 |
| 2001/0011790 A1* | 8/2001 | Satori | ..................... | F16F 13/14 267/140.13 |
| 2002/0125400 A1* | 9/2002 | Takashima | ............ | F16F 13/101 248/618 |
| 2006/0043658 A1* | 3/2006 | Tanaka | .................. | F16F 13/108 267/140.13 |
| 2007/0138719 A1* | 6/2007 | Ichikawa | ............... | F16F 13/268 267/140.14 |
| 2008/0054152 A1* | 3/2008 | Maeno | ................... | F16F 13/264 248/562 |
| 2010/0201053 A1* | 8/2010 | Okumura | ............... | F16F 13/106 267/140.13 |
| 2011/0006466 A1* | 1/2011 | Ichikawa | ............... | F16F 13/105 267/140.13 |
| 2012/0242021 A1 | 9/2012 | Koyama et al. | | |
| 2013/0001843 A1* | 1/2013 | Kanaya | ................... | F16F 13/26 267/140.14 |
| 2014/0246558 A1* | 9/2014 | Ichikawa | ............. | F16F 13/1409 248/634 |
| 2015/0048562 A1* | 2/2015 | Satori | ...................... | F16F 13/10 267/140.13 |
| 2015/0060633 A1* | 3/2015 | Han | ........................ | F16F 15/04 248/562 |
| 2015/0069686 A1* | 3/2015 | Okumura | ................ | F16F 13/08 267/140.13 |
| 2016/0138671 A1* | 5/2016 | Kim | ........................ | F16F 13/10 267/140.14 |
| 2017/0089420 A1* | 3/2017 | Kadowaki | ............ | B60K 5/1208 |
| 2018/0266513 A1* | 9/2018 | Abe | ...................... | B60K 5/1208 |
| 2019/0154105 A1* | 5/2019 | Ishikawa | ............... | F16F 13/107 |

FOREIGN PATENT DOCUMENTS

| | | |
|---|---|---|
| JP | H05-280588 A | 10/1993 |
| JP | H06-94068 A | 4/1994 |
| JP | H09-089037 A | 3/1997 |
| JP | 2002-357242 A | 12/2002 |
| JP | 2006-97717 A | 4/2006 |
| JP | 2008-223785 A | 9/2008 |
| JP | 2017-172608 A | 9/2017 |

OTHER PUBLICATIONS

Apr. 23, 2020 Office Action issued in Chinese Patent Application No. 201811532431.7.

* cited by examiner

VIBRATION-DAMPING DEVICE

INCORPORATED BY REFERENCE

The disclosures of Japanese Patent Application Nos. 2017-246569 filed on Dec. 22, 2017 and 2018-098880 filed on May 23, 2018, each including the specification, drawings and abstract is incorporated herein by reference in its entirety.

BACKGROUND OF THE INVENTION

1. Field of the Invention

The present invention relates to a vibration-damping device that is applied to an automotive engine mount, etc., and especially relates to a vibration-damping device including a dynamic damper.

2. Description of the Related Art

Conventionally, there has been known a vibration-damping device that is applied to an automotive engine mount, etc. The vibration-damping device has a structure wherein a first mounting member and a second mounting member, each being mounted to either one of components of a vibration transmission system, are elastically connected by a main rubber elastic body.

For example, in Japanese Unexamined Patent Publication No. JP-A-H6-094068, it is proposed to improve vibration-damping performance by adding a dynamic damper to an engine mount. Specifically, JP-A-H6-094068 discloses a structure wherein the engine mount includes a cup-shaped casing, while a mass member is housed in an air chamber formed by the casing, and the mass member is elastically supported by a rubber to constitute the dynamic damper.

However, as FIGS. 1 and 2 of JP-A-H6-094068 show, if the mass member of the dynamic damper is elastically supported by the rubber on only one side, the rubber easily undergoes elastic deformation with swinging motion upon input of a vibration, which may lead to deterioration of the vibration-control effect by displacement of the mass member.

Meanwhile, as FIG. 3 of JP-A-H6-094068 shows, by employing a structure wherein the rubber is disposed at the outer periphery of the mass member of the dynamic damper, and the mass member is elastically supported in all radial directions, it is possible to stabilize displacement mode of the mass member. However, with the structure shown in FIG. 3 of JP-A-H6-094068, a bolt, which is a mounting structure to the engine or the body, is provided directly for the casing, so that a large deformation rigidity is required for the casing. This may lead to limitation about the forming material of the casing, weight increase by thickening of the casing, or the like.

SUMMARY OF THE INVENTION

The present invention has been developed in view of the above-described matters as the background, and it is an object of the present invention to provide a vibration-damping device with a novel structure capable of lowering a required level of deformation rigidity for a tubular outer member attached to a second mounting member in a dynamic damper and enhancing the deformation rigidity of the tubular outer member without thickening the tubular outer member.

The above and/or optional objects of this invention may be attained according to at least one of the following modes of the invention. The following modes and/or elements employed in each mode of the invention may be adopted at any possible optional combinations.

Specifically, a first mode of the present invention provides a vibration-damping device comprising: a first mounting member configured to be mounted to one of components of a vibration transmission system; a second mounting member configured to be mounted to an other of the components of the vibration transmission system; a main rubber elastic body connecting the first mounting member and the second mounting member elastically to each other; a bracket attached to the second mounting member, the bracket having a mounting part configured to be mounted to the other of the components of the vibration transmission system; a tubular outer member secured press-fit to the second mounting member; a mass member disposed within the tubular outer member; and a support rubber fixed at an outer peripheral part of the mass member, the support rubber elastically connecting the tubular outer member and the mass member to constitute a dynamic damper.

According to this vibration-damping device structured following the first mode, it is possible to provide both vibration-damping effect based on internal friction by elastic deformation of the main rubber elastic body, etc. and vibration-control effect by the dynamic damper, so that the vibration-damping performance improves.

Additionally, the tubular outer member is secured press-fit in relation to the second mounting member, thus reinforcing the tubular outer member by the second mounting member. This makes it possible to make deformation rigidity of the tubular outer member in isolation comparatively small, while getting a large deformation rigidity of the tubular outer member in a mounted state to the second mounting member. Accordingly, for example, it is also possible to lighten the tubular outer member by thinning it and avoid the deformation of the tubular outer member.

The dynamic damper has a structure wherein the mass member is disposed within the tubular outer member and the outer peripheral part of the mass member is elastically supported by the support rubber. Hence, prizing displacement of the mass member is less likely to occur in relation to an axial vibration input, so that vibration-control action in relation to the input vibration can be efficiently provided. Particularly, if the mass of the mass member is made large in order to advantageously obtain the vibration-control effect by the dynamic damper, the target vibration-control effect can be effectively provided as well by stably supporting the mass member at its outer peripheral part, while the tubular outer member that supports the mass member having a large mass via the support rubber is prevented from being deformed by reinforcement effect by press-fit securing.

A second mode of the present invention provides the vibration-damping device according to the first mode, wherein the tubular outer member opens to opposite axial sides, and an end of one axial opening of the tubular outer member is secured press-fit to the second mounting member, while the mass member is exposed to an outside from the tubular outer member via an other axial opening of the tubular outer member.

With the second mode, compared with a case where the mass member is housed in a tubular outer member having a bottomed-tube shape, it becomes easier to set a larger axial dimension of the mass member in a limited disposition space of the vibration-damping device. As a result, it is easier to largely get the mass of the mass member, so that the vibration-control effect owing to the dynamic damper can be favorably gotten.

A third mode of the present invention provides the vibration-damping device according to the second mode, wherein an end of the other axial opening of the tubular outer member includes a reinforcement part bent to a radial inside.

According to the third mode, the end of one axial opening of the tubular outer member is reinforced by being secured press-fit in relation to the second mounting member, while the end of the other axial opening of the tubular outer member is reinforced by the reinforcement part. This largely keeps the deformation rigidity of the tubular outer member. Especially, the reinforcement part is provided at the end of the other axial opening that is remote from the section that is secured press-fit in relation to the second mounting member, whereby the deformation rigidity of the tubular outer member can be efficiently enhanced.

A fourth mode of the present invention provides the vibration-damping device according to the third mode, wherein the support rubber is fixed to the reinforcement part of the tubular outer member.

With the fourth mode, it becomes easier to obtain a large compression spring component of the support rubber with respect to an axial input, thus realizing a large degree of freedom in tuning the axial spring in the support rubber.

A fifth mode of the present invention provides the vibration-damping device according to any one of the first to fourth modes, wherein the tubular outer member has a step part provided at an axially middle part thereof.

According to the fifth mode, the step part functions as a reinforcement structure, so that the deformation rigidity of the tubular outer member improves.

A sixth mode of the present invention provides the vibration-damping device according to any one of the first to fifth modes, wherein the tubular outer member opens to a lower side, while a detent projection is provided projecting to a radial inside at an opening of the tubular outer member on the lower side so that the detent projection constitutes a fail-safe structure avoiding the mass member from becoming dislodged out of the tubular outer member to the lower side.

With the sixth mode, if the support rubber should break, it would be possible to prevent dislodgement of the mass member from the tubular outer member to the lower side, by the fail-safe structure, so that the safety improves. Besides, the effective fail-safe structure can be realized by the simple structure wherein the detent projection is provided at the lower opening of the tubular outer member.

A seventh mode of the present invention provides the vibration-damping device according to any one of the first to sixth modes, wherein the second mounting member has a tubular shape, and one axial side opening of the second mounting member is closed by the main rubber elastic body, while an other axial side opening of the second mounting member is closed by a flexible film, and a pressure-receiving chamber whose wall is partially constituted by the main rubber elastic body and an equilibrium chamber whose wall is partially constituted by the flexible film are formed between the main rubber elastic body and the flexible film, and the tubular outer member secured press-fit to the second mounting member extends out to an axial outside, while the mass member is disposed on the axial outside relative to the flexible film, and the tubular outer member and the mass member are elastically connected by the support rubber, while a communication hole opening a space formed axially between the flexible film and the mass member to an atmosphere is formed in at least one of the tubular outer member, the mass member, and the support rubber.

According to the seventh mode, since the vibration-damping device is formed as fluid-filled type, it is possible to provide excellent vibration-damping effect based on fluid flowing action. Moreover, the dynamic damper is provided for the fluid-filled vibration-damping device that exhibits excellent vibration-damping effect with respect to a vibration of preset frequency. By so doing, it is possible to realize effective vibration-damping performance with respect to a plurality of kinds of vibrations with different frequencies, or realize more excellent vibration-damping performance with respect to a vibration with a specific frequency, for example.

Additionally, the communication hole is provided, thus preventing the space formed between the flexible film and the mass member from being sealed tightly. This makes it possible to avoid air spring of the space from interfering in deformation of the flexible film, so that pressure difference between the pressure-receiving chamber and the equilibrium chamber is largely exhibited in a vibration input. Consequently, it is possible to efficiently obtain the vibration-damping effect based on the fluid flowing action, or the like.

An eighth mode of the present invention provides the vibration-damping device according to the seventh mode, wherein the mass member is disposed on a lower side relative to the flexible film, while a covering rubber covering an upper face of the mass member is formed integrally with the support rubber.

With the eighth mode, even if the flexible film touches the upper face of the mass member in a vibration input, noise is inhibited by buffering action of the covering rubber. Besides, by fixing the covering rubber formed integrally with the support rubber on the mass member, it is possible as well to improve the fixation strength between the support rubber and the mass member and the durability. Moreover, the upper face of the mass member is covered with the covering rubber. Thus, even if water, etc. enters between the flexible film and the mass member and stays there, corrosion such as rust in the mass member is avoided. Furthermore, since the surface of the mass member is wide and covered with the covering rubber, even if the mass member is brought to high temperature due to external heat, radiation heat from the mass member to the flexible film is moderated by the covering rubber, so that it is possible to expect an effect of restraining the temperature of the flexible film, the filled liquid in the equilibrium chamber, and the like from rising. In addition, it is possible as well to expect restraining effect in relation to vibration and noise due to resonance, etc. of the mass member, the tubular outer member, and the like.

A ninth mode of the present invention provides the vibration-damping device according to the eighth mode, wherein a material injection part in molding the support rubber and the covering rubber is provided in the covering rubber.

According to the ninth mode, the material injection part in rubber molding, which is difficult to equalize with other portion in shape or in characteristics due to occurrence of a projecting part, or the like, is provided at a position out of the support rubber constituting the dynamic damper. Consequently, it is possible to more stably obtain the target characteristics in the support rubber, and hence the dynamic damper.

A tenth mode of the present invention provides the vibration-damping device according to the ninth mode, wherein the material injection part protrudes at a position closer to an outer peripheral end than to a center in the upper face of the mass member, while a thickness dimension of the covering rubber is made partially larger to form a material guide part that extends from the material injection part to the support rubber.

With the tenth mode, it is possible to avoid unnecessary thickening of the covering rubber at the central portion of the upper face of the mass, while keeping good fluidity of the rubber material from the material injection part to the support rubber when the material is injected in a rubber molding cavity of the mold, using the material guide part. Additionally, the material injection part is set on the outer peripheral side of the upper face of the mass member out of the portion facing the central part of the flexible film that is easily deformed largely in a vibration input. Therefore, even if a projecting part occurs in the material injection part, reduction of the durability of the flexible film due to contact of the flexible film on the projecting part can be moderated or prevented.

An eleventh mode of the present invention provides the vibration-damping device according to any one of the seventh to tenth modes, wherein the mass member is disposed on a lower side relative to the flexible film, and the communication hole opens in an upper face of the mass member, while the upper face of the mass member includes a tapered face that inclines downward toward an opening of the communication hole.

According to the eleventh mode, the space between the flexible film and the mass member is opened to the atmosphere via the communication hole formed in the mass member. In addition, for example if water enters the upside of the mass member, the water which comes therein is guided to the opening of the communication hole by the tapered face provided in the upper face of the mass member and exhausted into the outside rapidly via the communication hole. This makes it possible to avoid accumulation of water on the upper face of the mass member for a long term, thus preventing problems such as rusting of the mass member.

A twelfth mode of the present invention provides the vibration-damping device according to any one of the seventh to eleventh modes, wherein the mass member is disposed on a lower side relative to the flexible film, and the communication hole opens in an upper face of the support rubber.

With the twelfth mode, the space between the flexible film and the mass member is opened to the atmosphere via the communication hole formed in the support rubber. In addition, for example if water enters the upside of the support rubber, the water is exhausted into the outside rapidly via the communication hole. This makes it possible to avoid accumulation of water on the upper face of the support rubber for a long term, thus preventing problems such as deterioration of the support rubber. It is also possible to use the communication hole in the support rubber, in addition to the communication hole in the mass member described in the eleventh mode.

It is also possible to adjust the spring characteristics of the support rubber by the shape, the size, the disposition, the formation number, and the like of the communication hole, whereby the target spring characteristics of the support rubber can be obtained.

A thirteenth mode of the present invention provides the vibration-damping device according to any one of the first to twelfth modes, wherein the bracket has an attachment tube part secured press-fit to the second mounting member.

According to the thirteenth mode, the bracket is secured press-fit in relation to the second mounting member, so that, via the reinforcement effect for the second mounting member, further reinforcement effect for the tubular outer member can be realized by the bracket. In this invention, the tubular outer member and the bracket may be secured press-fit either into or externally about the second mounting member.

According to this invention, the tubular outer member of the dynamic damper is secured press-fit in relation to the second mounting member and thus reinforced by the second mounting member. This makes it possible to make the deformation rigidity of the tubular outer member in a single state comparatively small, while largely getting the deformation rigidity of the tubular outer member in a mounted state to the second mounting member. Hence, for example, it is possible as well to lighten the tubular outer member by thinning it, while preventing deformation of the tubular outer member. Moreover, the dynamic damper has a structure wherein the mass member is disposed within the tubular outer member and elastically supported at the outer peripheral part thereof by the support rubber. Therefore, prizing displacement of the mass member or the like is less likely to occur in relation to an axial vibration input, so that vibration-control action with respect to the input vibration can be efficiently gotten.

BRIEF DESCRIPTION OF THE DRAWINGS

The foregoing and/or other objects, features and advantages of the invention will become more apparent from the following description of embodiments with reference to the accompanying drawings in which like reference numerals designate like elements and wherein.

DETAILED DESCRIPTION OF EMBODIMENTS

Embodiments of the present invention will be described below in reference to the drawings.

Figure 1:
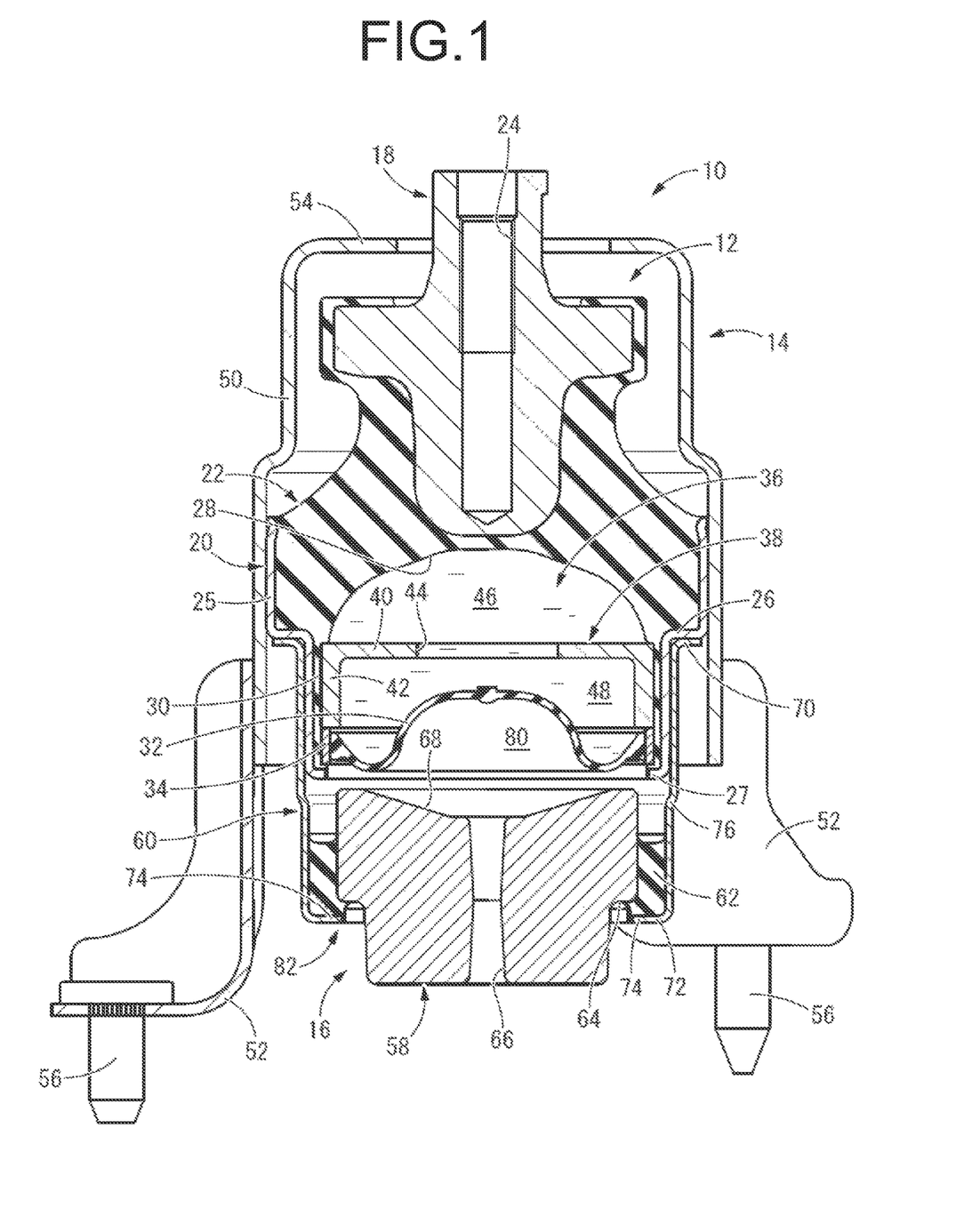
FIG. 1 is a cross sectional view showing a vibration-damping device in the form of an engine mount as a first embodiment of the present invention.
Figure 2:
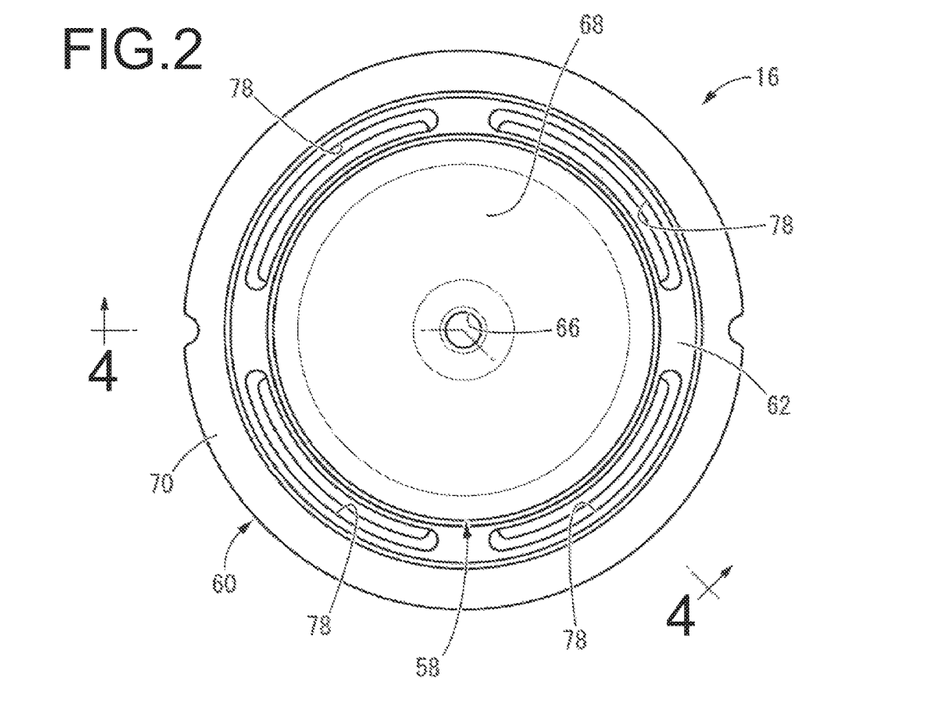
FIG. 2 is a plan view of a dynamic damper of the engine mount shown in FIG. 1.
Figure 3:
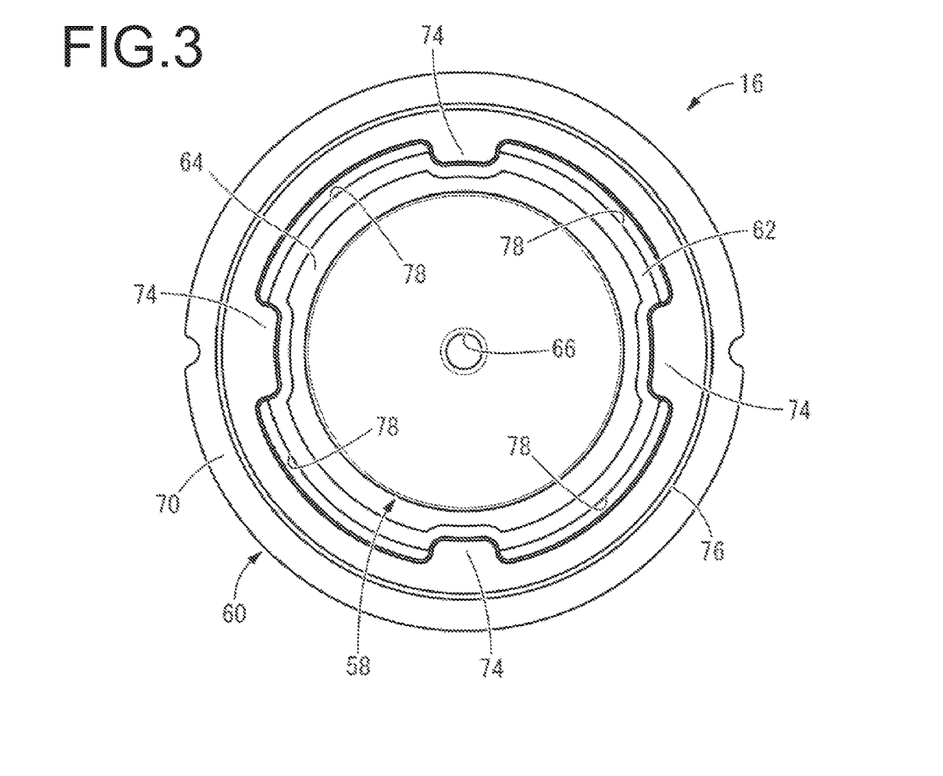
FIG. 3 is a bottom view of the dynamic damper shown in FIG. 2.
Figure 4:
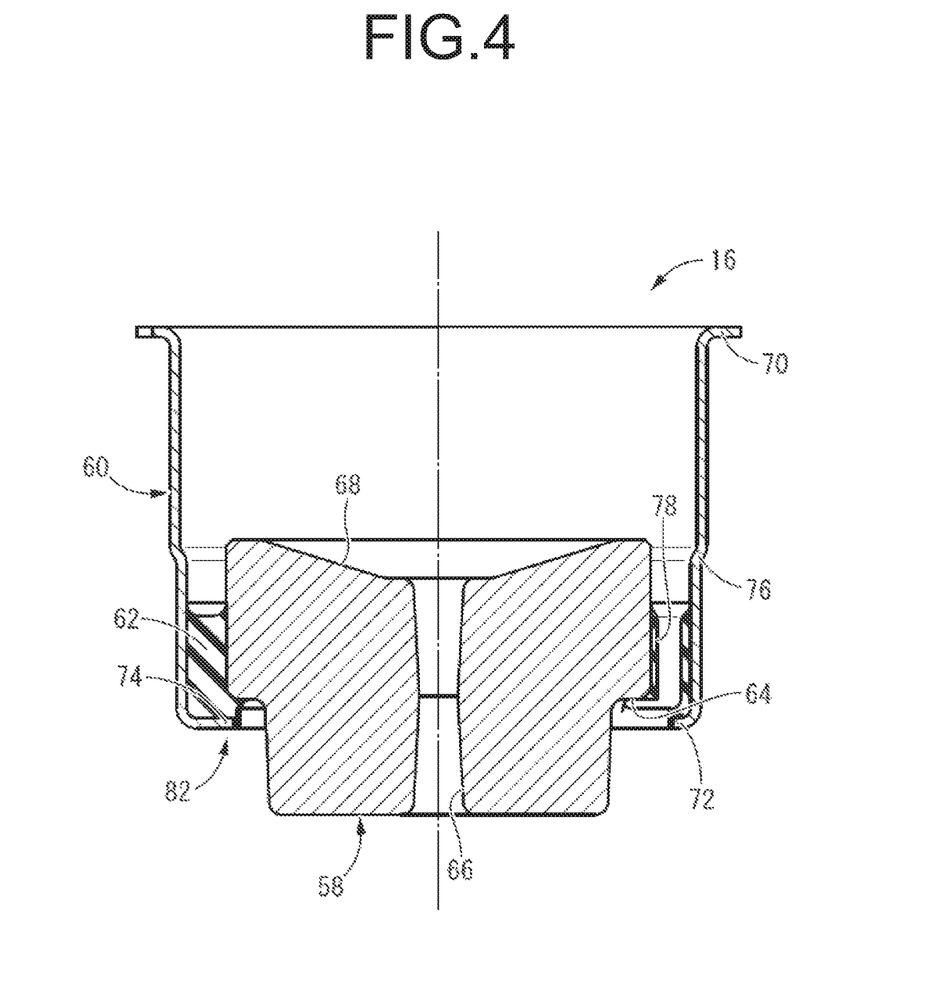
FIG. 4 is a cross sectional view taken along line 4-4 of FIG. 2.
Figure 5:
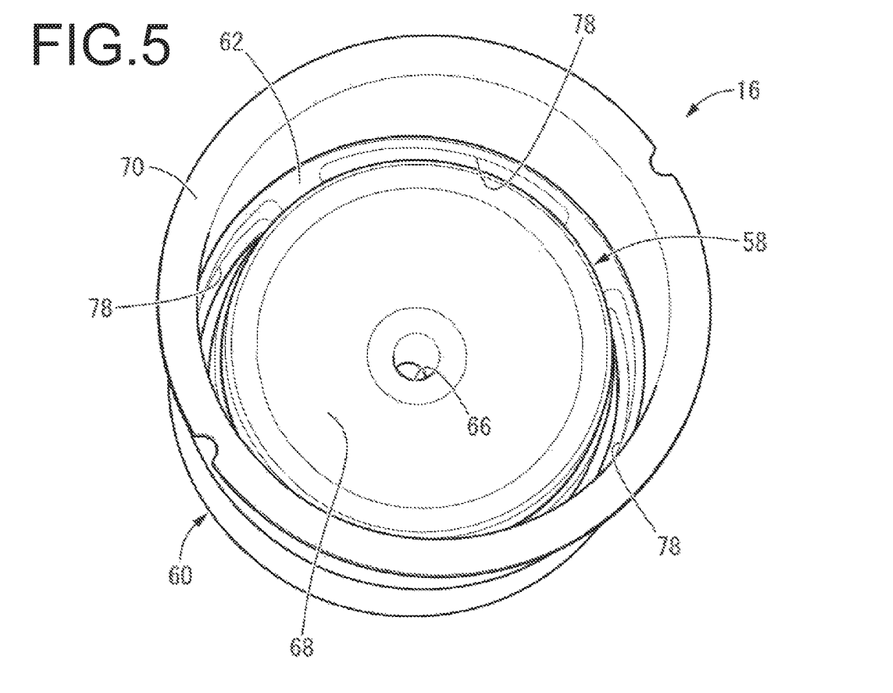
FIG. 5 is a perspective view of the dynamic damper shown in FIG. 2.
Figure 6:
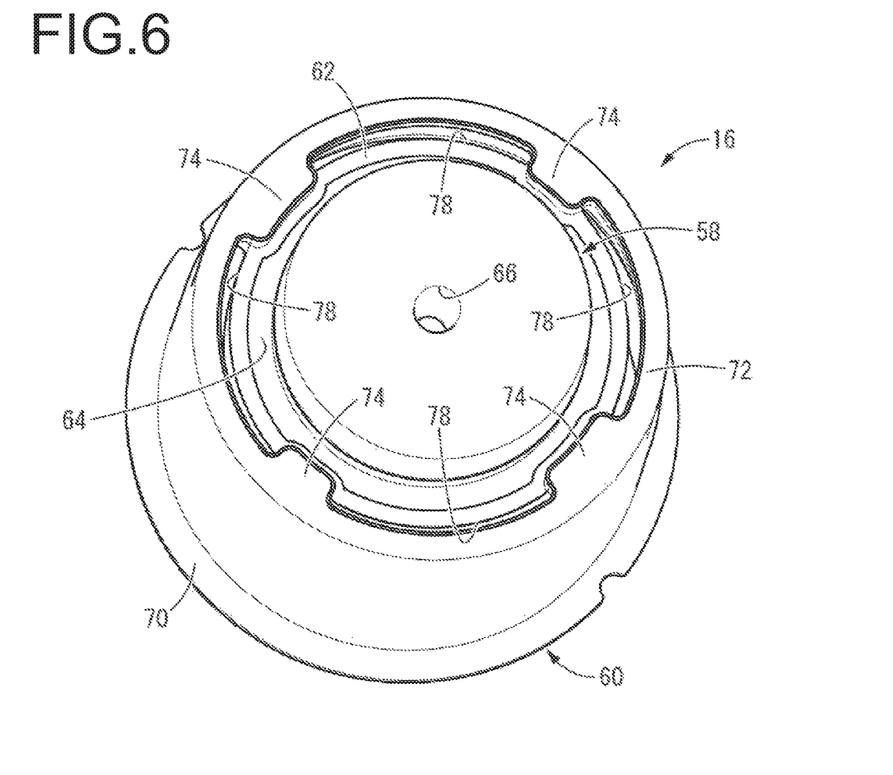
FIG. 6 is a perspective view showing the dynamic damper shown in FIG. 2 from another angle.

FIG. 1 shows an automotive engine mount 10 as a first embodiment of a vibration-damping device having a structure according to this invention. The engine mount 10 has a structure wherein a bracket 14 and a dynamic damper 16 are attached to a mount main body 12. In description hereinafter, the up-down direction is the axial direction and the up-down direction in FIG. 1, which is substantially the vertical up-down direction in a state of being mounted on the vehicle described later.

More specifically, the mount main body 12 is a fluid-filled vibration-damping device having a structure wherein a first mounting member 18 and a second mounting member 20 are elastically connected to each other by a main rubber elastic body 22.

The first mounting member 18 is a high rigidity member made of metal or the like in a roughly cylindrical shape extending in the axial direction as a whole, with its axially middle part being partially larger in diameter. Additionally, a screw hole 24 is formed in the first mounting member 18 so as to open to the upper face while extending in the up-down direction.

The second mounting member 20 is a high rigidity member made of metal or the like, including a cylindrical part 25 in a nearly cylindrical shape with a thin wall and a large diameter. At the axially middle part of the cylindrical part 25, a middle step part 26 is formed. The cylindrical part 25 has a stepped cylindrical shape wherein the upper section relative to the middle step part 26 is larger in diameter than the lower section relative to the middle step part 26. The second mounting member 20 of this embodiment is molded by press working (deep drawing). The lower end of the cylindrical part 25 is bent to the radial inside, so that the second mounting member 20 has an annular reinforcement rib 27, thus improving the deformation rigidity of the second mounting member 20.

The first mounting member 18 and the second mounting member 20 are disposed substantially coaxially in the up-down direction and connected elastically to each other by the main rubber elastic body 22. The main rubber elastic body 22 has a shape of nearly truncated cone, for which the central part in the diametrical direction is bonded by vulcanization to the first mounting member 18, while the outer peripheral face of the lower end with a large diameter is bonded by vulcanization to the radially inner face of the second mounting member 20. In this way, the main rubber elastic body 22 of this embodiment takes the form of an integrally vulcanization molded component incorporating the first mounting member 18 and the second mounting member 20. It is desirable that the second mounting member 20 is subjected to a diameter reduction process such as 360-degree radial compression after vulcanization molding of the main rubber elastic body 22, thus reducing tensile stress resulting from contraction after the molding of the main rubber elastic body 22.

In the main rubber elastic body 22, a concave portion 28 is formed opening to the lower face thereof. The concave portion 28 grows gradually larger in diameter as it goes toward its opening, and opens in the radial inside of the small-diameter part of the cylindrical part 25 in the second mounting member 20. Moreover, for the small-diameter part of the cylindrical part 25 of the second mounting member 20, the radially inner face is covered with a seal rubber layer 30. This seal rubber layer 30 is formed integrally with the main rubber elastic body 22, and has a thin tubular shape, extending to the lower side from the outer periphery of the concave portion 28.

To the lower end of the second mounting member 20, a flexible film 32 is attached. For example, the flexible film 32 is a thin rubber film with a slack in the up-down direction, and an annular fixation member 34 is fixed to the outer peripheral end of the flexible film 32. The fixation member 34 is inserted into the cylindrical part 25 of the second mounting member 20 and fitted to the small-diameter part of the cylindrical part 25 covered with the seal rubber layer 30, thereby attaching the flexible film 32 to the lower end of the second mounting member 20.

Owing to this, the upper opening of the cylindrical part 25 of the second mounting member 20 is closed fluid-tightly by the main rubber elastic body 22, while the lower opening of the cylindrical part 25 of the second mounting member 20 is closed fluid-tightly by the flexible film 32. Inside the cylindrical part 25 of the second mounting member 20, a fluid chamber 36 filled with a non-compressible fluid is formed axially between the main rubber elastic body 22 and the flexible film 32. The non-compressible fluid filled in the fluid chamber 36 is not particularly limited, but it is preferably a liquid with low viscosity of 0.1 Pa·s or lower. For example, it is possible to use water, ethylene glycol, alkylene glycol, polyalkylene glycol, silicone oil, a mixture liquid of some of them, or the like.

In the fluid chamber 36, a partition member 38 is disposed. The partition member 38 has a main part 40 in a nearly circular plate shape. At the outer peripheral end of the main part 40, a fitting part 42 is integrally formed in a roughly cylindrical shape extending out to the lower side. Besides, at the diametrically central part of the main part 40, an orifice passage 44 is formed through it in the up-down direction. For this orifice passage 44, the tuning frequency, which is the resonance frequency of the flowing fluid, is adjusted based on the ratio of the passage cross sectional area and the passage length. For example, the tuning frequency is set to a midrange to high frequency corresponding to idling vibration, driving rumble, and the like. However, the specific structure and tuning frequency of the orifice passage can be changed. For example, it is possible to form an orifice passage extending in the circumferential direction at the outer peripheral part of the partition member so as to keep a long passage length of the orifice passage, thus setting the tuning frequency of the orifice passage to be a low frequency that corresponds to engine shake.

The partition member 38 is disposed in the fluid chamber 36, and the outer peripheral end including the fitting part 42 is fitted to the small-diameter part of the cylindrical part 25 of the second mounting member 20 via the seal rubber layer 30. Consequently, the fluid chamber 36 is divided into two in the up-down direction by the partition member 38. On the upper side of the partition member 38, there is formed a pressure-receiving chamber 46 whose wall is partially constituted by the main rubber elastic body 22, while, on the lower side of the partition member 38, there is formed an equilibrium chamber 48 whose wall is partially constituted by the flexible film 32. These pressure-receiving chamber 46 and equilibrium chamber 48 are sealed with the non-compressible fluid filled therein and communicated with one another by the orifice passage 44.

For the mount main body 12 with this structure, the bracket 14, which is a separate part, is attached to the second mounting member 20. The bracket 14 is a high rigidity member made of metal etc. having a structure wherein a plurality of mounting parts 52 are fixed to the lower end part of an attachment tube part 50, which has a substantially cylindrical shape. In the attachment tube part 50, the upper end part is integrally provided with a stopper receiving part 54 having an annular plate shape that projects to the radial inside. Meanwhile, the lower part of the attachment tube part 50 has a larger diameter than that of the upper part thereof, and the lower part of the attachment tube part 50 with the larger diameter is mounted externally about the second mounting member 20 by press-fit securing. The mounting part 52 has a cross sectional shape that is bent substantially in a shape of character L. About the mounting part 52, the upper end is superposed to the outer peripheral face of the lower end of the attachment tube part 50 and fixed thereto by such means as welding, while at the lower end, a mounting bolt 56 protruding downward is fixed in a penetrating state.

To the mount main body 12, the dynamic damper 16 is attached. As FIGS. 2 to 6 show, the dynamic damper 16 has a structure wherein a mass member 58 and a tubular outer member 60 are elastically connected by a support rubber 62.

More specifically, the mass member 58 is formed with a high gravity material such as iron, in a roughly cylindrical shape as a whole. Moreover, a step face 64 is provided in the outer peripheral face of the mass member 58 such that the lower side of the step face 64 has a smaller diameter than that of the upper side thereof. Furthermore, in the diametrically central part of the mass member 58, a mass communication hole 66 is formed serving as a communication hole passing through it in the up-down direction. This mass communication hole 66 opens in the upper face of the mass member 58 wherein a tapered face 68 is formed inclining downward toward the upper opening of the mass communication hole 66. The tapered face 68 is provided in the diametrically central part in the upper face of the mass member 58 across the entire periphery, and it slants downward as it goes to the radial inside.

The tubular outer member 60 is formed as a part separate from the second mounting member 20 and the bracket 14, using a metal or the like. The tubular outer member 60 has a nearly cylindrical shape with a thin wall and a large diameter opening to opposite axial sides, namely both sides in the up-down direction. With the upper end of the tubular outer member 60, a flange part 70 that protrudes to the outer periphery is integrally formed continuously across the entire periphery. Meanwhile, the lower end of the tubular outer member 60 is bent to the radial inside, so that a reinforcement part 72 having an inner flange shape protruding to the radial inside is integrally formed with the lower end of the tubular outer member 60, continuously across the entire periphery. This improves the deformation rigidity of the tubular outer member 60. Besides, at the lower end of the tubular outer member 60, detent projections 74 are provided at a plurality of locations (four locations in this embodiment) spaced apart in the circumferential direction so as to extend out further to the radial inside than the reinforcement part 72. The tubular outer member 60 of the present embodiment is molded by performing press working (deep drawing) on a metal blank plate.

The tubular outer member 60 has a smaller diameter in the lower part than in the upper part, and a step part 76 is formed in the axially middle part thereof. The step part 76 of this embodiment is formed continuously across the entire periphery, in a substantially constant tapered shape that slants downward as it goes to the radial inside. For the tubular outer member 60, the small-diameter part on the lower side of the step part 76 has a shorter axial length than that of the large-diameter part on the upper side of the step part 76.

The whole tubular outer member 60 is formed with a nearly constant thickness, which is thinner than that of the attachment tube part 50 of the bracket 14 and is substantially equal to or thinner than that of the second mounting member 20.

The mass member 58 is disposed within the tubular outer member 60, and the support rubber 62 is disposed between the mass member 58 and the tubular outer member 60. The support rubber 62 is an annular rubber elastic body having a plurality of rubber communication holes 78 serving as communication holes in the present embodiment. The rubber communication holes 78 are formed penetrating in the up-down direction with a prescribed cross sectional shape extending in the circumferential direction. For the rubber communication holes 78, the upper opening opens in the upper face of the support rubber 62 radially between the mass member 58 and the tubular outer member 60, while the lower opening opens to the radially inner face of the support rubber 62 between the mass member 58 and the reinforcement part 72 of the tubular outer member 60. In this embodiment, four rubber communication holes 78, 78, 78, 78 are disposed separately from one another at substantially equal intervals in the circumferential direction.

In the support rubber 62, the outer peripheral face is bonded by vulcanization to the radially inner face of the tubular outer member 60, and the lower face is bonded by vulcanization to the upper faces of the reinforcement part 72 and the detent projections 74 in the tubular outer member 60. Meanwhile, the radially inner face of the support rubber 62 is bonded by vulcanization to the outer peripheral part of the mass member 58, i.e., the step face 64 and the large-diameter part which is upper than the step face 64. Consequently, the mass member 58 and the tubular outer member 60 are elastically connected to each other by the support rubber 62.

In the state the mass member 58 and the tubular outer member 60 are elastically connected by the support rubber 62, the mass member 58 is exposed to the outside via the lower opening of the tubular outer member 60. In this embodiment, the lower part of the mass member 58 with a small diameter partially protrudes to the lower side out of the lower opening of the tubular outer member 60. Owing to this, for example when another member of the vehicle is disposed on the lower side of the tubular outer member 60, it is possible to dispose the mass member 58 radially inside the other member of the vehicle and get a large mass for the mass member 58. The step face 64 of the mass member 58 is positioned on the upper side of the reinforcement part 72 and the detent projections 74 constituting the lower end of the tubular outer member 60. The large-diameter part on the upper side of the step face 64 in the mass member 58 is disposed within the tubular outer member 60 across the entirety.

Additionally, about the elastic center extending in the diametrical direction of the support rubber 62, it is desirable that the distance from the center of gravity of the mass member 58 is short. Preferably, the elastic center is set to pass through the center of gravity of the mass member 58. This reduces prizing displacement of the mass member 58 in relation to a vibration input in the up-down direction, which will be described later. The support rubber 62 is fixed to the small-diameter part on the lower side of the step part 76 of the tubular outer member 60.

Furthermore, after vulcanization molding of the support rubber 62, the tubular outer member 60 is subjected to a diameter constriction process, thereby decreasing the tensile stress by shrinkage after the molding of the support rubber 62. Besides, the radially inner part of the detent projection 74 of the tubular outer member 60 is disposed at a position such that it is superposed to the step face 64 of the mass member 58, when viewed in the axial direction. The support rubber 62 is disposed on the lower side of the step part 76 of the tubular outer member 60.

The dynamic damper 16 of this structure is attached to the mount main body 12 by securing the tubular outer member 60 press-fit to the second mounting member 20. Specifically, the large-diameter part on the upper side of the step part 76 in the tubular outer member 60 is secured press-fit about and on the small-diameter part on the lower side of the middle step part 26 in the cylindrical part 25 of the second mounting member 20. By so doing, the upper part of the tubular outer member 60 is fixed to the second mounting member 20, while the tubular outer member 60 extends out to the lower side of the second mounting member 20. Consequently, the mass member 58 and the support rubber 62 are disposed on the lower side of the mount main body 12, and the dynamic damper 16 is constituted substantially on the lower side of the mount main body 12. A space 80 is formed between the flexible film 32 of the mount main body 12 and the mass member 58 and the support rubber 62 of the dynamic damper 16 in the up-down direction. This space 80 is opened to the atmosphere by the mass communication hole 66 and the rubber communication holes 78, thus keeping the internal pressure to be roughly atmospheric pressure.

In this way, the upper part of the tubular outer member 60 is secured press-fit in relation to the lower part of the second mounting member 20. By so doing, the tubular outer member 60 is reinforced by the second mounting member 20, so that it is possible to prevent deformation of the tubular outer member 60, without setting the deformation rigidity of the tubular outer member 60 itself especially large. Especially in this embodiment, the second mounting member 20 is secured press-fit to the attachment tube part 50 of the bracket 14 with a thick wall, while the lower end of the second mounting member 20 is provided with a reinforcement rib 27. This enhances the deformation rigidity of the second mounting member 20, so that the reinforcement effect of the tubular outer member 60 by press-fit securing in relation to the second mounting member 20 is exhibited more favorably. In other words, the bracket 14 is secured press-fit externally about and on the second mounting member 20 to improve the deformation rigidity of the second mounting member 20. As a result, in relation to the tubular outer member 60 secured press-fit externally about and on the second mounting member 20, the reinforcement effect of the bracket 14 is exerted via the second mounting member 20.

Also, with respect to the tubular outer member 60 of the present embodiment, the lower end which is separate from the press-fit section in relation to the second mounting member 20 is bent to the radial inside so as to provide the reinforcement part 72. This efficiently keeps the deformation rigidity of the tubular outer member 60.

Moreover, in the tubular outer member 60, at a part protruding to the axially lower side from the section secured press-fit in relation to the second mounting member 20, an annular step part 76 is formed with a tapered shape. This step part 76 is located also out of the section of the tubular outer member 60 where the support rubber 62 is fixed. Thus, the step part 76 is provided axially between the section secured press-fit in relation to the second mounting member 20 and the section where the support rubber 62 is fixed in the tubular outer member 60. Since the step part 76 is provided in an axially middle part of the tubular outer member 60, at a position out of the section secured press-fit in relation to the second mounting member 20 and the section where the support rubber 62 is fixed in the tubular outer member 60 in this way, the deformation rigidity of the tubular outer member 60 is further enhanced.

The tubular outer member 60 is a part separate from the bracket 14 that is fixed directly on the vehicle body, which will be described later, so that the great level of deformation rigidity required for fixation to the vehicle body is not required for the tubular outer member 60. Therefore, while reducing its weight by thinning its wall, necessary deformation rigidity is kept in the tubular outer member 60 by securing it press-fit in relation to the second mounting member 20 as well as by forming the reinforcement part 72 and the step part 76, and sufficient deformation rigidity is set in the bracket 14, whereby stable attachment to the vehicle is realized.

The axial position of the tubular outer member 60 relative to the second mounting member 20 is determined by axial contact of the flange part 70 provided at the upper end of the tubular outer member 60 on the middle step part 26 of the second mounting member 20. Owing to this, the mass member 58 is disposed on the lower side of the lower end of the second mounting member 20, separately from the flexible film 32 to the lower side. The initial separation distance of the mass member 58 with respect to the flexible film 32 is set to avoid contact between the flexible film 32 and the mass member 58 especially in deformation of the flexible film 32 and the displacement of the mass member 58 in the up-down direction. Also, since the flange part 70 is superposed and abutted on the middle step part 26 of the second mounting member 20, the flange part 70 is reinforced by the middle step part 26 whose deformation rigidity is made large by the second mounting member 20 being fitted to the attachment tube part 50 of the bracket 14. This further improves the deformation rigidity of the tubular outer member 60.

With the engine mount 10 having this structure, for example, the first mounting member 18 is attached to the side of a not-shown power unit, while the second mounting member 20 is attached to the side of the not-shown vehicle body via the bracket 14. Consequently, the power unit and the vehicle body are connected to one another in a vibration-damping manner via the engine mount 10. The bracket 14 is mounted to the vehicle body in the mounting part 52 including the mounting bolt 56, so that the lower face of the mounting part 52 is the mounting face of the bracket 14 to the vehicle body. Besides, the position of the lower end of the mass member 58 is set at least upper than the extended face of the lower face of the mounting part 52 positioned at the lowest end.

In the state of being mounted to the vehicle described above, a vibration input in the up-down direction induces relative pressure fluctuation between the pressure-receiving chamber 46 and the equilibrium chamber 48, thus having the fluid flow via the orifice passage 44 between the pressure-receiving chamber 46 and the equilibrium chamber 48. This exhibits the vibration-damping effect based on the flowing action such as the resonance action of the fluid, thus exerting the target vibration-damping effect. Especially in the present embodiment, the orifice passage 44 is tuned to a midrange to high frequency such as idling vibration and driving rumble, so that vibration isolation action owing to low dynamic spring is exerted in input of a vibration with the midrange to high frequency.

Moreover, when a vibration is input in the up-down direction, the mass member 58 is displaced in the up-down direction relative to the tubular outer member 60 in the dynamic damper 16, thereby exerting an effect of reducing the input vibration in a cancelling manner. This exhibits vibration-damping effect by the dynamic damper 16 in addition. About the mass member 58, the outer diameter dimension of the large-diameter part upper than the step face 64 is smaller than the inner diameter dimension of the reinforcement rib 27 of the second mounting member 20 and smaller than the inner diameter dimension of the fixation member 34 of the flexible film 32. The outer peripheral end of the upper end of the mass member 58 is positioned on the radially inner side of the reinforcement rib 27 and the fixation member 34. This makes it possible to prevent the rigid mass member 58 from being abutted on the rigid reinforcement rib 27 and fixation member 34 due to the displacement in the up-down direction. In addition, it becomes also possible to allow a large displacement stroke in the up-down direction of the mass member 58 while avoiding the axial dimension of the engine mount 10 from becoming large.

By adjusting the resonance frequency of the mass-spring system constituted by the mass member 58 and the support rubber 62 in the dynamic damper 16, it is possible to set the frequency of the vibration which is the target to be controlled by the dynamic damper 16 depending on the necessity. Specifically, for example, by having the resonance frequency of the dynamic damper 16 be roughly the same as the tuning frequency of the orifice passage 44 in the mount main body 12, it is possible to realize more excellent vibration-damping performance in relation to a vibration with the specific frequency. Meanwhile, by differentiating the tuning frequency of the orifice passage 44 and the resonance frequency of the dynamic damper 16 from each other, it is possible to realize effective vibration-damping performance in relation to a plurality of kinds of input vibrations with different frequencies. Moreover, in this embodiment, a plurality of rubber communication holes 78 are formed in the support rubber 62, and the spring of the support rubber 62 is adjusted by the shape, the hole cross sectional area, the formation number, or the like of the rubber communication holes 78. Furthermore, in the present embodiment, the support rubber 62 is disposed not only radially between the outer peripheral face of the mass member 58 and the radially inner face of the tubular outer member 60, but also axially between the step face 64 of the mass member 58 and the reinforcement part 72 and the detent projection 74 of the tubular outer member 60, thus adjusting the axial spring of the support rubber 62.

The dynamic damper 16 of this embodiment has a structure wherein the outer periphery of the mass member 58 is elastically supported by the annular support rubber 62. Thus, the mass member 58 is less likely to be displaced in the prizing direction, etc., and the vibration-control effect owing to the up-down displacement of the mass member 58 can be efficiently provided.

The mass communication hole 66 is formed in the mass member 58, and the rubber communication holes 78 are formed in the support rubber 62. Consequently, the space 80 formed between the flexible film 32 and the mass member 58 and the support rubber 62 in the up-down direction is communicated with the external space via the mass communication hole 66 and the rubber communication holes 78. This opens the space 80 to the atmosphere, and avoids the air spring of the space 80 from hampering the deformation of the flexible film 32. As a result, relative pressure fluctuation between the pressure-receiving chamber 46 and the equilibrium chamber 48 is largely induced in the mount main body 12 when an axial vibration is input, so that it is possible to efficiently provide the vibration-damping effect based on the fluid flowing action.

Besides, even if water enters the space 80 via the mass communication hole 66 and the rubber communication holes 78, for example, water on the mass member 58 is discharged into the outside through the mass communication hole 66, while water on the support rubber 62 is discharged into the outside through the rubber communication holes 78. Particularly, in the upper face of the mass member 58 having a large area, a tapered face 68 is provided slanting downward as it goes to the upper opening of the mass communication hole 66, so that water on the mass member 58 is led to the mass communication hole 66 and immediately discharged. This avoids water from staying on the upper faces of the mass member 58 and the support rubber 62 for a long period, and it becomes possible to prevent rust, deterioration, or the like of the mass member 58 and the support rubber 62.

When viewed in the up-down direction, the detent projections 74 of the tubular outer member 60 are superposed to the step face 64 of the mass member 58. Thus, even if the support rubber 62 breaks, the mass member 58 is not dislodged out of the tubular outer member 60 to the lower side, whereby the safety is kept by a fail-safe structure 82 constituted including the detent projections 74. Also, when the support rubber 62 breaks, there is a possibility that the mass member 58 tilts. However, in this embodiment, the part upper than the step face 64 in the mass member 58 has a sufficient axial length, and the like. Owing to this, irrespective of the orientation of the mass member 58, the mass member 58 is configured to be caught by the detent projections 74 of the tubular outer member 60 so as to function as the fail-safe structure 82, so that the mass member 58 is not dislodged downward from the tubular outer member 60. As is clear from the fact the fail-safe structure 82 prevents dislodgement of the mass member 58 to the lower side, the detent projections 74 constituting the fail-safe structure 82 are disposed on the lower side, which is the direction of gravity action when the engine mount 10 is mounted to the vehicle, relative to the mass member 58.

Figure 7:
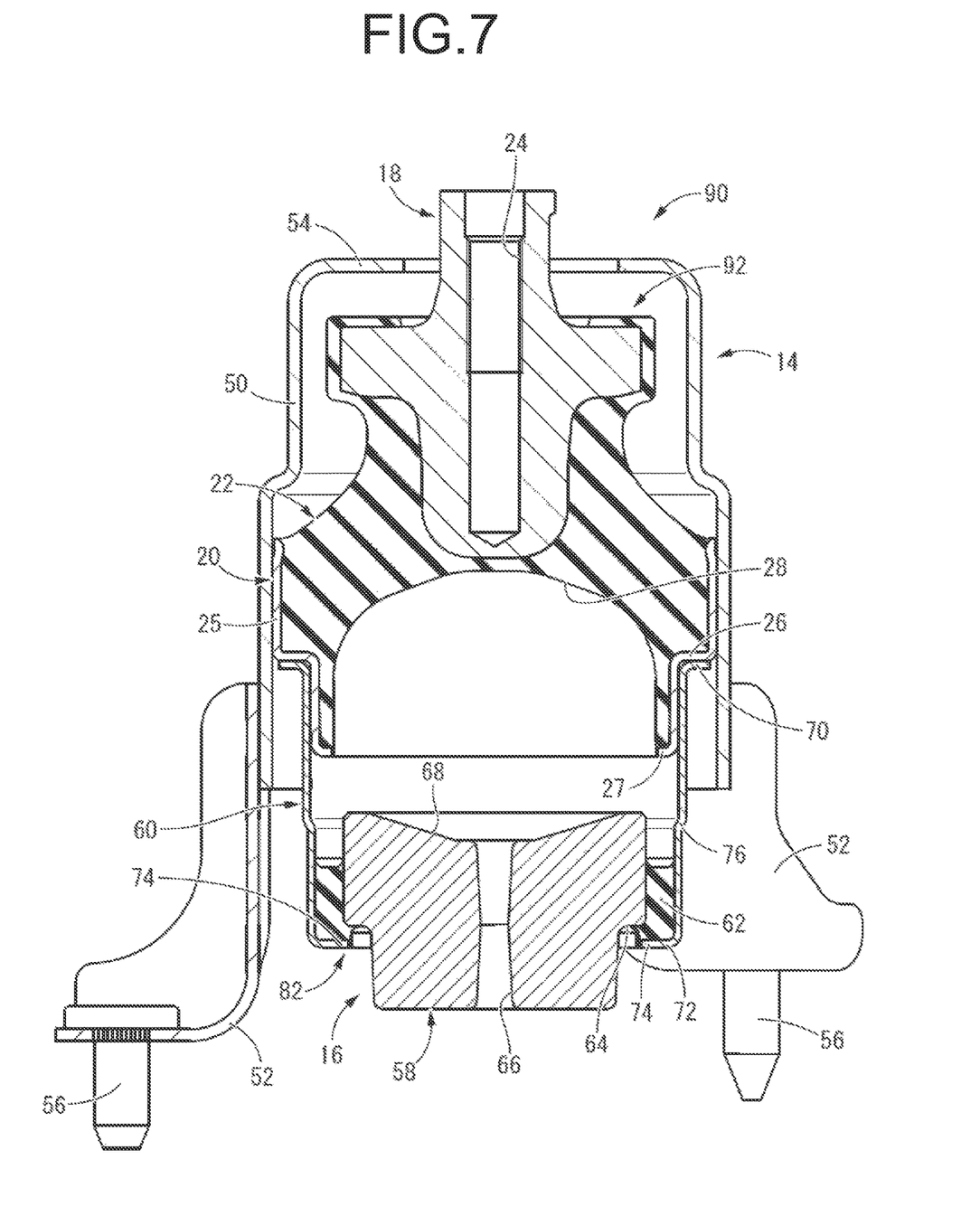
FIG. 7 is a cross sectional view showing an engine mount as another embodiment of the present invention.

The embodiment of the present invention has been described above, but this invention is not limited by the specific description of the embodiment. For example, in the aforesaid embodiment, the mount main body 12 that is the fluid-filled vibration-damping device is shown as an example, but it is also possible to use a solid type mount main body wherein a fluid is not filled. Specifically, an engine mount 90 serving as a vibration-damping device shown in FIG. 7 has a structure wherein the bracket 14 and the dynamic damper 16 are mounted to a mount main body 92. The mount main body 92 has a structure wherein the first mounting member 18 and the second mounting member 20 are elastically connected by the main rubber elastic body 22, and there are not formed the pressure-receiving chamber and the equilibrium chamber with the non-compressible fluid filled therein as the above-mentioned embodiment. In the engine mount 90 of FIG. 7 like this, in relation to a vibration input in the up-down direction, it is possible to effectively provide vibration-damping effect based on internal friction by the elastic deformation of the main rubber elastic body 22 and the like as well as vibration-control effect owing to the dynamic damper 16. In the engine mount 90 shown in FIG. 7, members and parts nearly equal to those of the aforesaid embodiment are given the same code numbers as those of the above-mentioned embodiment in the drawings, whereby a detailed description of them is omitted.

In the above-referenced embodiments, the support rubber 62 is fixed to the outer peripheral face of the mass member 58, but the shape, the fixation position in relation to the mass member 58 and the tubular outer member 60, and the like of the support rubber 62 are not limited. Also, in the aforementioned embodiments, the surface of the mass member 58 is exposed except for the fixation area of the support rubber 62, but it is also possible to cover a part or the entirety of the surface of the mass member 58 which may include the inner face of the mass communication hole 66, with a covering rubber or the like.

Figure 8:
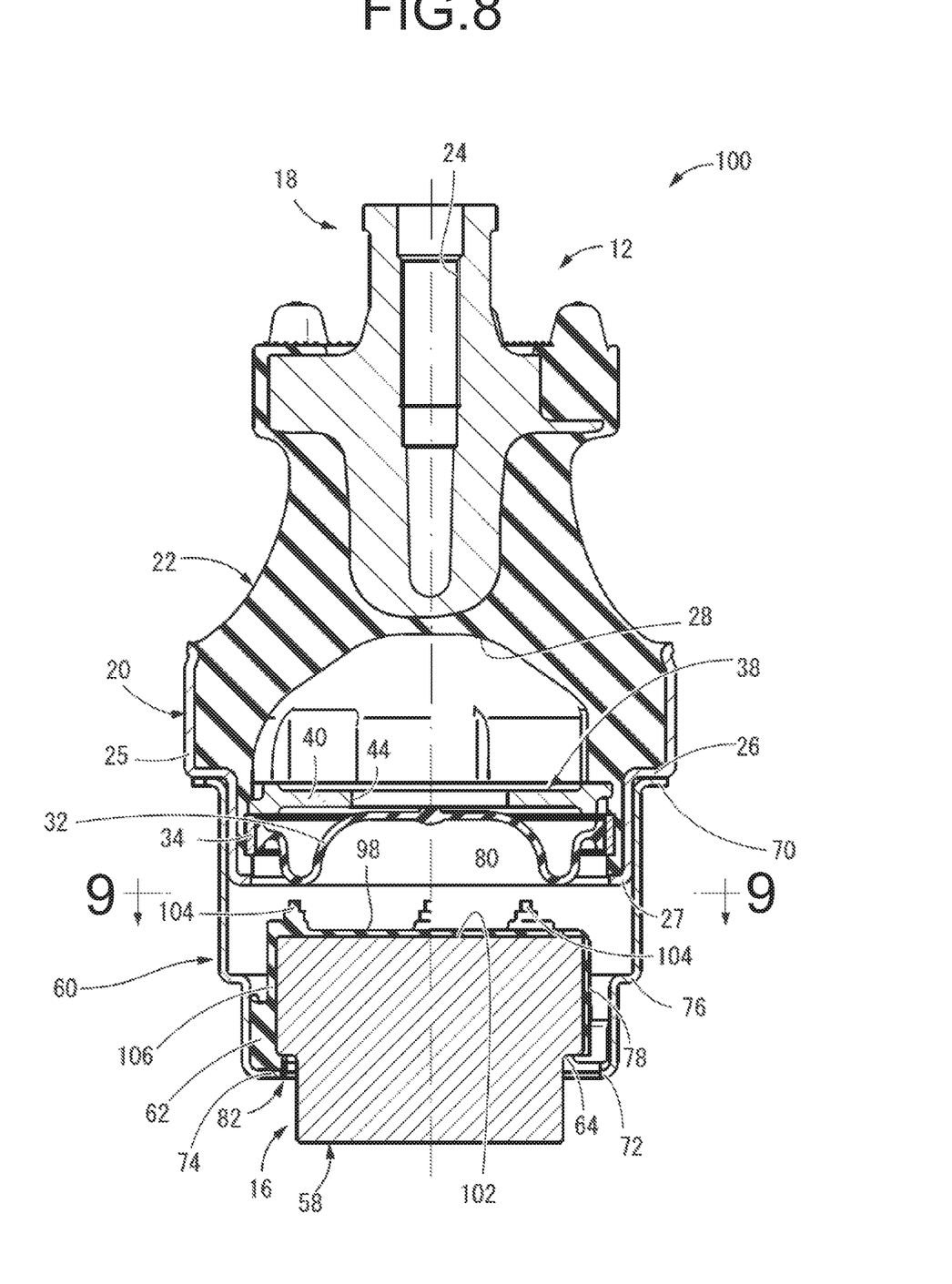
FIG. 8 is a cross sectional view showing an engine mount as yet another embodiment of this invention, taken along line 8-8 of FIG. 9.
Figure 9:
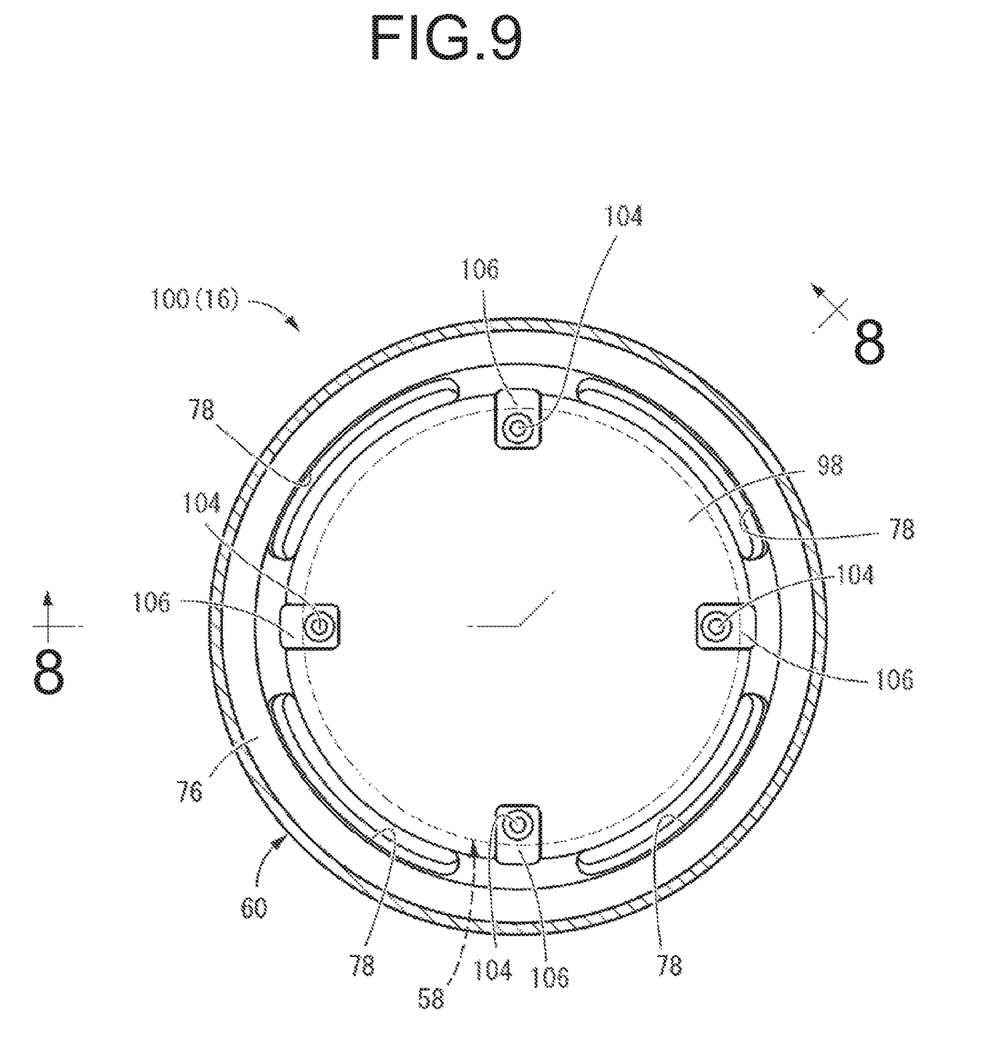
FIG. 9 is a cross sectional view taken along line 9-9 of FIG. 8.

Specifically, for example as FIGS. 8 and 9 show, it is possible to provide a covering rubber 98 covering the surface of the mass member 58 exposed to the internal space formed by the space between the opposed faces of the mass member 58 and the flexible film 32 being surrounded by the tubular outer member 60.

Specifically, in an engine mount 100 shown in FIGS. 8 and 9, an upper face 102 of the mass member 58 constituting the dynamic damper 16 expands in the axis-perpendicular direction orthogonal to the mount central axis and has a flat face shape that is a substantially horizontal face when being attached to the mount. The mass member 58 of this embodiment has a solid block structure wherein the mass communication hole (66) of the aforesaid embodiment is not formed.

The covering rubber 98 is formed to cover the surface of the mass member 58, and it is fixed to the outer peripheral face by vulcanization bonding or the like. This covering rubber 98 is formed integrally with the support rubber 62 constituting the dynamic damper 16. The covering rubber 98 may cover the whole surface of the mass member 58. However, in this embodiment, the covering rubber 98 covers a part expanding to the upper side from the fixation part of the support rubber 62 including the upper outer peripheral face and the upper face 102 of the mass member 58, substantially across its entirety. Consequently, when the dynamic damper 16 is mounted to the mount main body 12, the surface of the mass member 58 that faces the internal space 80 formed between the opposed faces of the flexible film 32 and the mass member 58, as surrounded by the tubular outer member 60 is covered with the covering rubber 98 substantially across its entirety.

The rubber material covers the whole surface of the mass member 58, and the thickness dimension of the covering rubber 98 can be molded stably. The thickness of the covering rubber 98 will do and is not limited as long as it is a necessary thickness dimension that can avoid damages such as abrasion by handling in manufacture and use after attachment. In this embodiment, in molding the covering rubber 98 and the support rubber 62 which are integrally formed, a rubber material injection part 104 in relation to the molding cavity of the mold is formed in the covering rubber 98. Thus, the thickness dimension of the covering rubber 98 is set considering the fluidity of the rubber material relative to the support rubber 62.

Specifically, in this embodiment, the material injection part 104 is formed to be positioned in the upper face 102 of the mass member 58, with mold release in the direction of the mount central axis (the up-down direction in the drawings) taken into account. Additionally, in the upper face 102 of the mass member 58, the material injection part 104 is set at a position separate from the center to the outer periphery by a prescribed distance and closer to the outer peripheral end than to the center. Also, a plurality (four in the figures) of material injection parts 104 are located at nearly equal intervals in the circumferential direction of the mass member 58. In this embodiment, all the material injection parts 104 are provided at positions spaced by a nearly equal distance from the outer peripheral end of the upper face 102 to the radial inside.

Each of the material injection parts 104 has a convex shape that protrudes upward corresponding to an inlet gate set in the mold. In the material injection part 104, the thickness dimension of the covering rubber 98 that covers the upper face 102 becomes large. In addition, in the covering rubber 98, the access from the material injection part 104 to the support rubber 62 is made thick to provide a material guide part 106. This material guide part 106 is formed by thickening the covering rubber 98 partially, whereby it is possible to keep a large flow passage cross sectional area for rapidly guiding the rubber material injected into the molding cavity from the material injection part 104 to the support rubber 62 in rubber molding, without thickening the covering rubber 98 that covers the central portion of the upper face 102, etc. beyond necessity.

The material guide part 106 can be formed with any access from the material injection part 104 to the support rubber 62. Especially, the material guide part 106 of this embodiment extends radially outward from the material injection part 104 set close to the outer peripheral end in the upper face 102 of the mass member 58, and extends downward from the outer peripheral end of the upper face 102 along the outer peripheral face in the axial direction to the support rubber 62. Thus, the material guide part 106 connects each of the material injection parts 104 to the support rubber 62 by the shortest access.

According to the engine mount 100 of the present embodiment, since the upper face 102 of the mass member 58 is covered by the covering rubber 98, rust of the mass member 58, etc. is avoided even if water or the like enters the internal space 80 and stays therein. In addition, the covering rubber 98 formed integrally with the support rubber 62 is fixed to the mass member 58, thus making it possible to improve the fixation strength of the support rubber 62 and the mass member 58 and the durability. Moreover, if the flexible film 32 is deformed in a vibration input to contact the mass member 58, buffering action of the covering rubber 98 constricts noise. Furthermore, the surface of the mass member 58 is covered with the covering rubber 98. Consequently, for example if the mass member 58 is brought to high temperature due to external heat, radiation heat from the mass member 58 to the flexible film 32 is moderated by the covering rubber 98. This makes it possible to expect suppression effect in relation to temperature rising of the flexible film 32, the filled fluid of the fluid chamber 36, and the like, as well as vibration and noise due to resonance of each member such as the mass member 58 and the tubular outer member 60, and the like.

Especially, since the material injection parts 104 of the support rubber 62 are provided at the covering rubber 98, also in a case that the material injection parts 104 have a local convex shape, and the like, it is possible to avoid an adverse effect on the characteristics of the support rubber 62 constituting the dynamic damper 16, or the like. Additionally, the material injection parts 104 are set close to the outer peripheral end of the upper face 102 of the mass member 58. Thus, if the material injection parts 104 have a convex shape, or the like, it is possible to prevent intense contact of the flexible film 32 deformed in a vibration input, as well as interfere in relation to the deformation of the flexible film 32, and a bad effect on the durability, etc.

In relation to the engine mount 100 shown in FIGS. 8 and 9, the bracket 14 can be secured press-fit on the second mounting member 20 externally about it, in the same way as the engine mount 10 of the aforesaid embodiment. In addition to that, the engine mount 100 of this embodiment has the same basic structure as that of the engine mount 10 of the above-referenced embodiment. Therefore, for easily understanding, the same code numbers are given in the drawings to the members and parts substantially equal to those of the above-mentioned embodiment.

Moreover, the specific shape, size, and the like of the mass member are just examples and they may be changed as appropriate depending on the vibration control performance required for the dynamic damper, the disposition space of the engine mount permitted in the vehicle, and the like.

Furthermore, the specific structure of the bracket may be changed as appropriate corresponding to the structure of the side of the vehicle body, and the like. The bracket is not necessarily limited to an item that is secured press-fit in relation to the second mounting member. For example, the bracket may be fixed by a means other than press-fit securing, such as bolt fixation.

In the aforementioned embodiment, the mass communication hole 66 that passes through the mass member 58 and the rubber communication hole 78 that passes through the support rubber 62 are shown as examples of the communication hole. However, it is also possible that the communication hole includes only one of the mass communication hole 66 and the rubber communication hole 78. Also, the communication hole will do as long as it is provided such that it opens the space 80 to the atmosphere. For example, the communication hole may be formed such that it perforates the peripheral wall of the tubular outer member 60, as well. The communication hole is not indispensable and can be omitted especially in the engine mount 90 of solid type shown in FIG. 7, including no risk of air spring hampering the deformation of the flexible film.

In the above-mentioned embodiments, there has been described the structure wherein the dynamic damper 16 is disposed on the lower side of the mount main body 12. However, the dynamic damper may be disposed on the upper side of the mount main body, for example.

Besides, in the aforementioned embodiments, the tubular outer member 60 and the bracket 14 are secured press-fit in relation to the second mounting member 20 in an external fitting state. For example, it is also possible that at least one of the tubular outer member and the bracket is inserted in the second mounting member and secured press-fit in the second mounting member.

It is possible to use not only the tubular outer member of the structure wherein both axial ends open like the aforesaid embodiments, but also a tubular outer member having a bottomed tubular shape for which one of the axial ends only opens, etc. In the case of the bottomed tubular shape, the axial end of the tubular outer member is reinforced by being secured press-fit in relation to the second mounting member, while the mass member and the support rubber can be protected by the bottom wall of the tubular outer member.

Moreover, the present invention is not applied only to the engine mount, and it can be applied to various known vibration-damping devices. Furthermore, this invention can be used for not only the automotive vibration-damping device, but also vibration-damping devices used for items other than an automobile.

What is claimed is:

1. A vibration-damping device comprising:
  a first mounting member configured to be mounted to one of components of a vibration transmission system;
  a second mounting member configured to be mounted to an other of the components of the vibration transmission system;
  a main rubber elastic body connecting the first mounting member and the second mounting member elastically to each other;
  a bracket attached to the second mounting member, the bracket having a mounting part configured to be mounted to the other of the components of the vibration transmission system;
  a tubular outer member secured press-fit to the second mounting member;
  a mass member disposed within the tubular outer member; and
  a support rubber fixed at an outer peripheral part of the mass member, the support rubber elastically connecting the tubular outer member and the mass member to constitute a dynamic damper,
  wherein the tubular outer member opens to opposite axial sides, and an end of one axial opening of the tubular outer member is secured press-fit to the second mounting member, while the mass member is exposed to an outside from the tubular outer member via an other axial opening of the tubular outer member.

2. The vibration-damping device according to claim 1, wherein an end of the other axial opening of the tubular outer member includes a reinforcement part bent to a radial inside.

3. The vibration-damping device according to claim 2, wherein the support rubber is fixed to the reinforcement part of the tubular outer member.

4. The vibration-damping device according to claim 1, wherein the tubular outer member has a step part provided at an axially middle part thereof.

5. A vibration-damping device comprising:
  a first mounting member configured to be mounted to one of components of a vibration transmission system;
  a second mounting member configured to be mounted to an other of the components of the vibration transmission system;
  a main rubber elastic body connecting the first mounting member and the second mounting member elastically to each other;
  a bracket attached to the second mounting member, the bracket having a mounting part configured to be mounted to the other of the components of the vibration transmission system;
  a tubular outer member secured press-fit to the second mounting member;
  a mass member disposed within the tubular outer member; and
  a support rubber fixed at an outer peripheral part of the mass member, the support rubber elastically connecting the tubular outer member and the mass member to constitute a dynamic damper, wherein the tubular outer member opens to a lower side, while a detent projection is provided projecting to a radial inside at an opening of the tubular outer member on the lower side so that the detent projection constitutes a fail-safe structure avoiding the mass member from becoming dislodged out of the tubular outer member to the lower side.

6. The vibration-damping device according to claim 1, wherein
  the second mounting member has a tubular shape, and one axial side opening of the second mounting member is closed by the main rubber elastic body, while an other axial side opening of the second mounting member is closed by a flexible film, and a pressure-receiving chamber whose wall is partially constituted by the main rubber elastic body and an equilibrium chamber whose wall is partially constituted by the flexible film are formed between the main rubber elastic body and the flexible film, and
  the tubular outer member secured press-fit to the second mounting member extends out to an axial outside, while the mass member is disposed on the axial outside relative to the flexible film, and the tubular outer member and the mass member are elastically connected by the support rubber, while a communication hole opening a space formed axially between the flexible film and the mass member to an atmosphere is formed in at least one of the tubular outer member, the mass member, and the support rubber.

7. The vibration-damping device according to claim 6, wherein the mass member is disposed on a lower side relative to the flexible film, while a covering rubber covering an upper face of the mass member is formed integrally with the support rubber.

8. The vibration-damping device according to claim 7, wherein a material injection part in molding the support rubber and the covering rubber is provided in the covering rubber.

9. The vibration-damping device according to claim 8, wherein the material injection part protrudes at a position closer to an outer peripheral end than to a center in the upper face of the mass member, while a thickness dimension of the covering rubber is made partially larger to form a material guide part that extends from the material injection part to the support rubber.

10. The vibration-damping device according to claim 6, wherein the mass member is disposed on a lower side relative to the flexible film, and the communication hole opens in an upper face of the mass member, while the upper face of the mass member includes a tapered face that inclines downward toward an opening of the communication hole.

11. The vibration-damping device according to claim 6, wherein the mass member is disposed on a lower side relative to the flexible film, and the communication hole opens in an upper face of the support rubber.

12. The vibration-damping device according to claim 1, wherein the bracket has an attachment tube part secured press-fit to the second mounting member.

\* \* \* \* \*